United States Patent [19]

Moe

[11] 4,249,616
[45] Feb. 10, 1981

[54] FOLDING IMPLEMENT AND FOLDING SUPPORT THEREFOR

[75] Inventor: Richard G. Moe, La Porte, Ind.

[73] Assignee: Allis-Chalmers Corporation, Milwaukee, Wis.

[21] Appl. No.: 63,363

[22] Filed: Aug. 3, 1979

[51] Int. Cl.$^2$ ............................................. A01B 73/00
[52] U.S. Cl. ..................................... 172/311; 172/501
[58] Field of Search ............... 172/311, 446, 456, 466, 172/501, 662

[56] References Cited

U.S. PATENT DOCUMENTS

| | | | |
|---|---|---|---|
| 3,321,028 | 5/1967 | Groenke | 172/311 |
| 4,133,391 | 1/1979 | Richardson et al. | 172/311 |
| 4,159,038 | 6/1979 | Eichenberger | 172/311 |
| 4,178,998 | 12/1979 | Rockwell | 172/311 |

FOREIGN PATENT DOCUMENTS 491335  2/1976  U.S.S.R. .................... 172/311

*Primary Examiner*—Richard T. Stouffer

[57] ABSTRACT

A multiple section fold-up agricultural implement is provided with a folding support (61) for the outboard section (13). When the outboard section (13) is pivoted from its aligned position with the adjacent implement section (12), as shown in FIG. 2, to its folded position as shown in FIGS. 3 and 4, a long support arm (62) swings from a low silhouette position of FIG. 2 to an extended bracing position wherein the cradle (76) on the end of the support arm (62) abuts the frame member (77) of the outboard section (13) sufficiently far from the folding axis (26) to adequately support outboard section (13), particularly in its inverted position, shown in FIG. 4, wherein excessive forces would otherwise be imposed on the folding mechanism (45) during travel over rough terrain.

3 Claims, 4 Drawing Figures

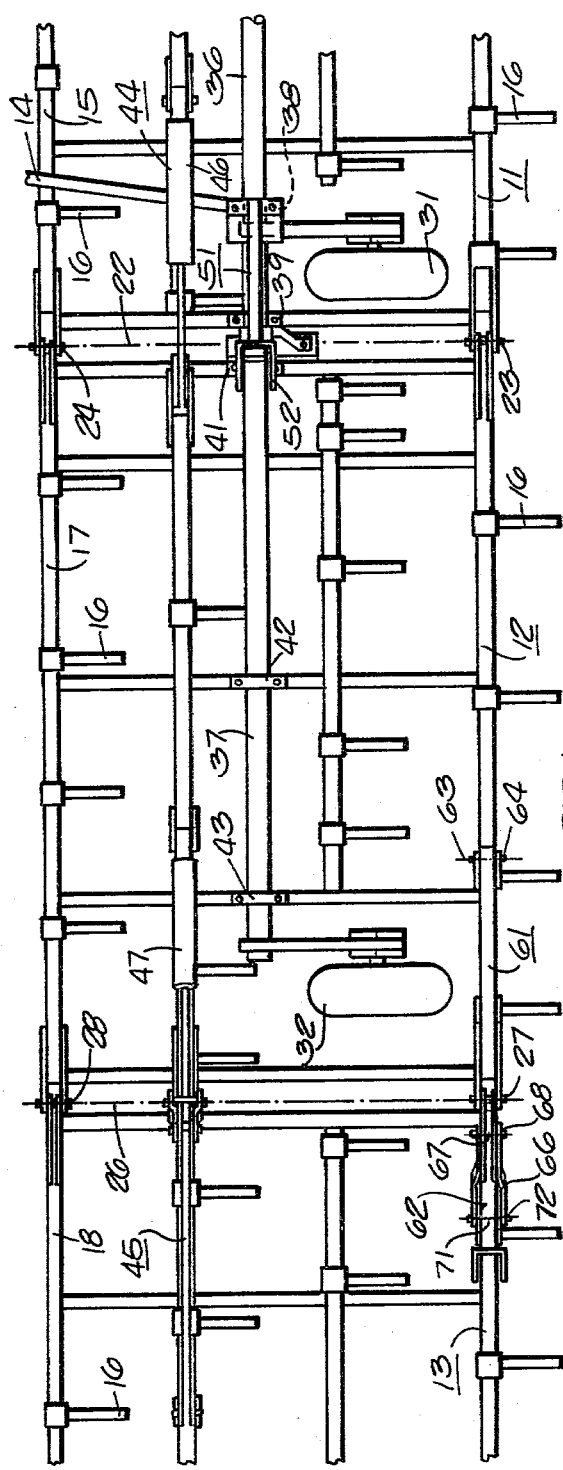
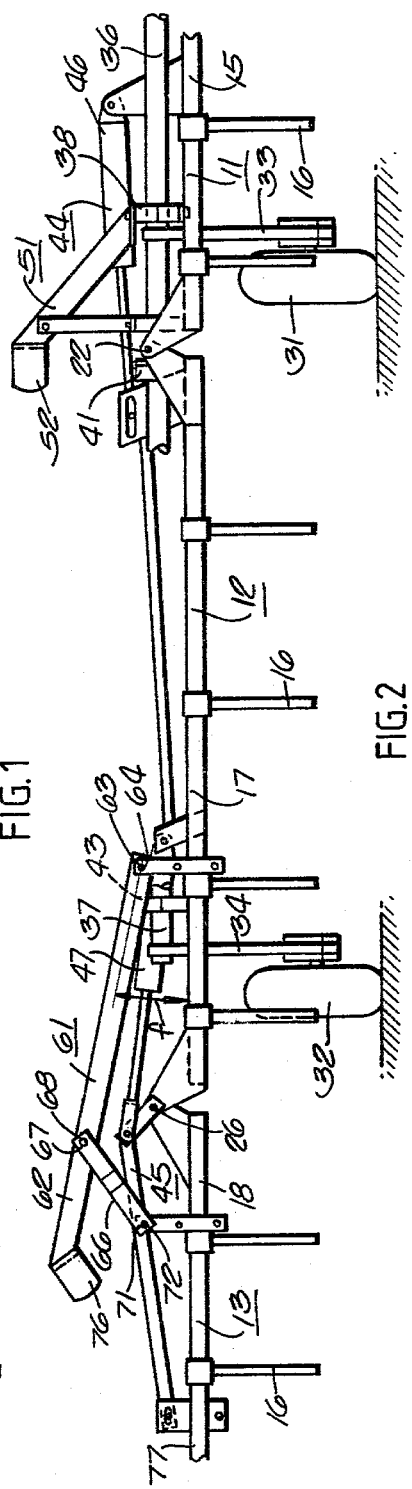

FOLDING IMPLEMENT AND FOLDING SUPPORT THEREFOR

This invention relates to a folding agricultural implement and more particularly to a foldable support for a foldable section of the implement.

BACKGROUND OF THE INVENTION

Heretofore, others have provided fixed supports for foldable sections of agricultural implements whereby the foldable implement section is supported in its folded position. One such arrangement is shown in U.S. Pat. No. 3,321,028. It has been customary to rigidly secure the supports to one implement section so as to present an abutment surface engageable with a complementary abutment surface on the folding section. The support structures have characteristically extended above the implement sections to a considerable extent thereby presenting a rather unattractive implement silhouette.

BRIEF DESCRIPTION OF THE INVENTION

The invention is incorporated in a foldable implement having support and folding sections pivotally interconnected on a longitudinal folding axis and an actuator for causing the folding section to pivot about the longitudinal folding axis from a working position, wherein the sections are in alignment, to a folded transport position. A novel folding support is provided for supporting the folding section in its folded position which includes a main support arm pivotally connected at one of its ends to the support section on a first longitudinal pivot axis which is parallel to and spaced laterally from the folding axis. The folding support also includes a link pivotally connected at one of its ends to an intermediate point of the support arm on a second longitudinal axis. The other end of the link is pivotally connected to the folding section on a third longitudinal axis which is parallel to and spaced laterally from the folding axis. The link causes the arm to swing from a first predetermined angular relationship with the support section, wherein the folding support has a low silhouette, to a support position of increased angle relationship with the support section wherein the other end of the arm is in abutting relationship with the folding section, when the latter is pivoted from its working position to its folded transport position.

This invention permits a rather long support arm to be used for supporting the folding section in its folded condition without having a grotesque, high silhouette support structure extending above the implement when it is in an unfolded operating position.

BRIEF DESCRIPTION OF THE DRAWINGS

The invention is illustrated by the drawings wherein:

FIG. 1 is a partial top view of a multiple-section, foldable implement incorporating the present invention;

FIG. 2 is a partial rear view of the foldable implement illustrated in FIG. 1;

DETAILED DESCRIPTION OF THE INVENTION

Figure 3:
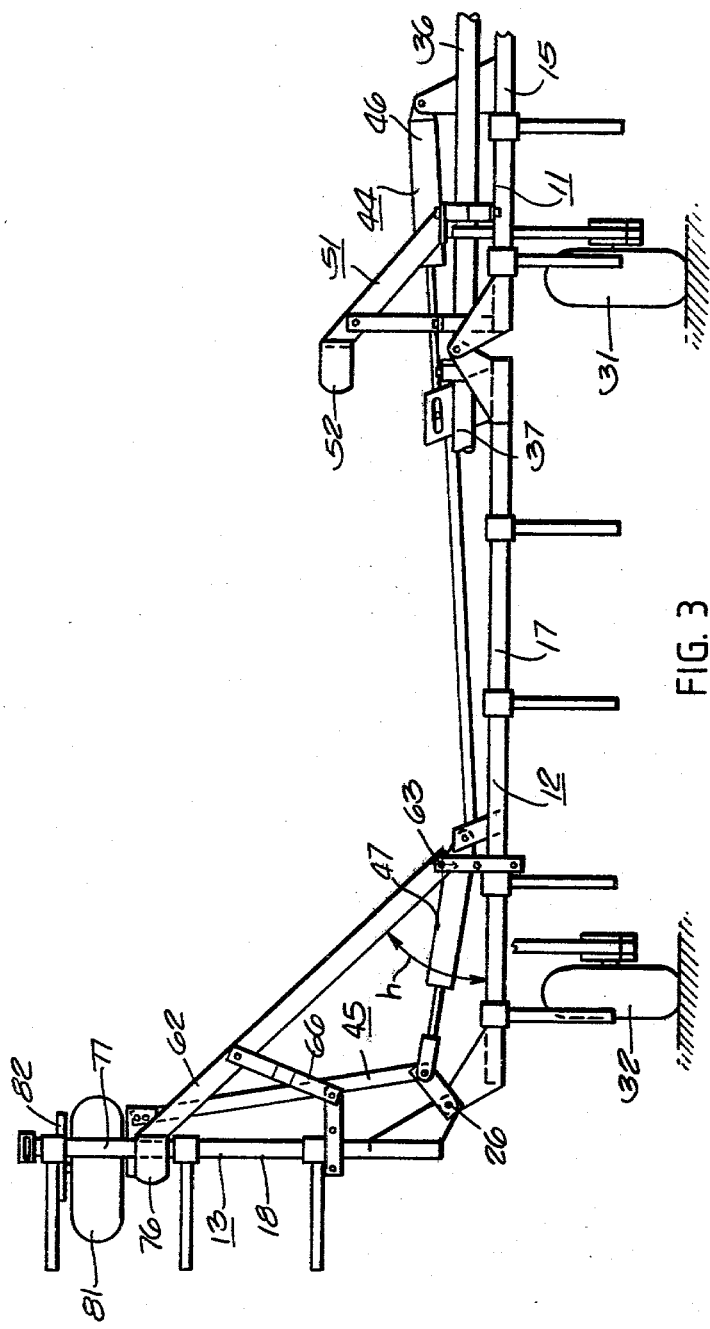
FIG. 3 is a partial rear view of the foldable implement showing the outboard implement section folded to a transport position.

As shown in FIGS. 1 and 2, the foldable implement includes a main nonfolding section 11, an inboard folding section 12 and an outboard folding section 13. It should be understood that there are a total of five sections for the foldable implement and that inboard and outboard foldable sections similar to sections 12 and 13 are provided on the right-hand side of the implement, not shown. A suitable draft structure 14 is secured to the frame 15 of the central main section 11 and its forward end, not shown, is adapted for draft connection to a tractor, not shown. The illustrated implement is a field cultivator with appropriate earthworking shanks 16. The frame 17 of inboard section 12 is pivotally connected to the frame 15 of the main section 11 on a longitudinal pivot axis 22 by a pair of aligned pivot pins 23, 24 and the frame 18 of the outboard section 13 is pivotally connected to the frame 17 of the inboard section 12 on a longitudinal pivot axis 26 by a pair of aligned pivot pins 27, 28. As illustrated in FIGS. 1 through 4, the field cultivator is in a raised position wherein the earthworking shanks 16 are not penetrating the soil. The cultivator sections are supported in the raised position by ground engaging wheels 31, 32 rotatably mounted on arms 33, 34 having their upper ends welded to transverse cross shafts 36, 37 which are journaled on the frames 11, 12 by bearing blocks 38, 39, 41, 42, 43. The implement is raised and lowered by power means, not shown, operatively connected to the shafts 36, 37.

As illustrated in FIGS. 1 and 2, the implement sections are in horizontal alignment and as such may be considered to be in a working position, although the implement will not be in an actual earthworking position until lowered by rotation of the support wheel shafts 36, 37. When lowered to an earthworking position, the section frames 15, 17, 18 remain in general horizontal alignment with some deviation being permitted by conventional lost-motion connections in the raising and lowering mechanisms 44, 45 incorporating and powered by hydraulic actuators 46, 47, respectively.

Figure 4:
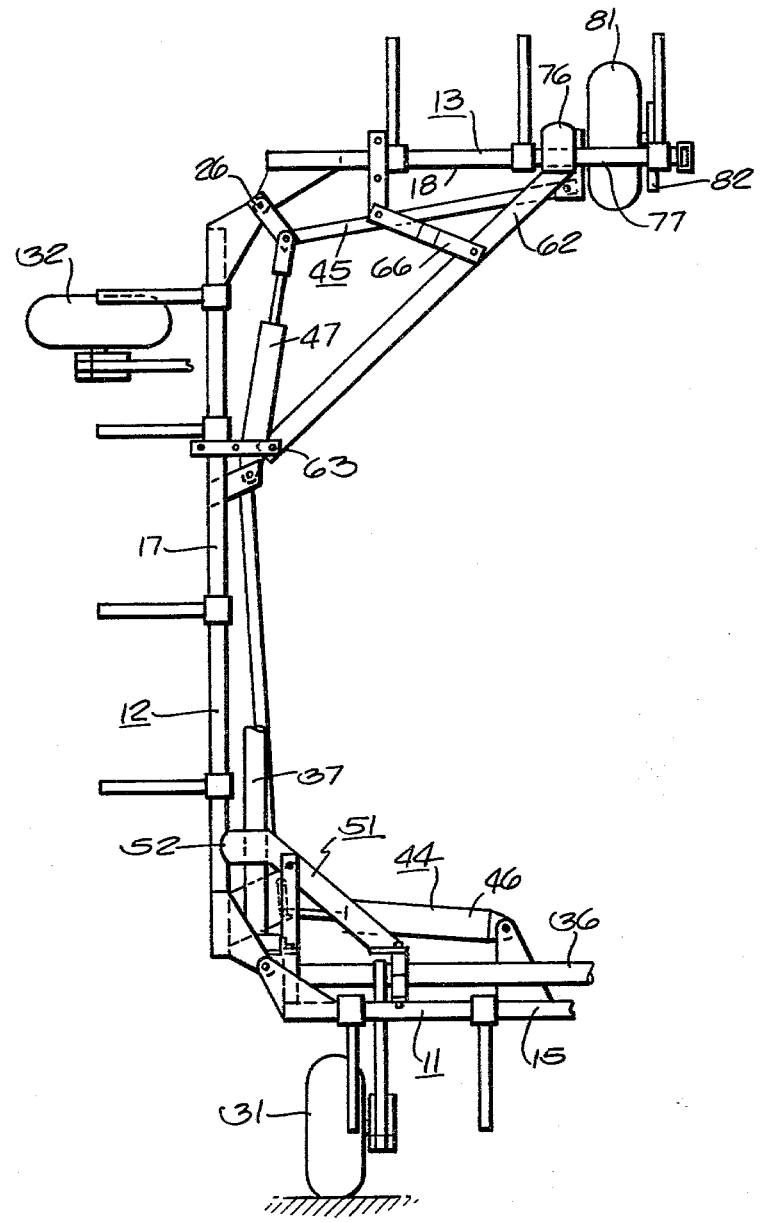
FIG. 4 is a rear view showing both the outboard and inboard implement sections in their folded transport positions.

A relatively low height support structure 51 is rigidly secured to the frame 15 of the main implement section 11 which includes a U-shaped cradle 52 for abutment with the shaft 37 on inboard section frame 17 when the latter is pivoted to an upright transport position, as shown in FIG. 4, by contraction of double acting hydraulic actuator 46.

The outboard folding section 13 is supported relative to the inboard folding section by a support mechanism 61 which includes a rather long main support arm 62 providing adequate support of the section when in the cantilevered folded transport position shown in FIG. 4. In order to avoid the unsightly appearance of a high support structure when the implement is in a working position, the support 61 folds to a lowered position when the implement sections are aligned. The support arm 62 is pivotally connected at its inboard end to the frame 17 of inboard section 12 on a longitudinal axis 63 by a pivot pin 64. The axis 63 is parallel to and spaced laterally inboard from the folding axis 26. A folding support 61 also includes a relatively short link 66 having one end pivotally connected to an intermediate point of the arm 62 on an axis 67 by pviot pin 68 and its other end pivotally connected to the frame 18 of outboard section 13 on a longitudinal axis 71 by a pivot pin 72. In the working position of the sections 12, 13, the axis 71 is spaced laterally outboard of and parallel to the folding axis 26 and the axis 68 is spaced above and parallel to the axes 26, 63, 71. It will be noted in the working or aligned position of the sections 12, 13, as shown in FIG. 2, that the folding support has a relatively low silhouette with the arm 62 defining a predetermined angle f of about 12 degrees with the frame 17 of implement section 12.

When the actuator in the form of double acting hydraulic jack 47 is contracted to move the outboard or foldable implement section 13 to its folded position relative to section 12, as shown in FIGS. 3 and 4, the arm will swing upwardly rom the inboard section to define an angle h therewith of about 45 degrees. In this position, the U-shaped cradle 76 on the free outboard end of the support arm 62 supportingly engages a laterally extending frame member 77 of the frame 18 of outboard section 13. The long support arm 62 supports the outboard section 13 near its free end (just inboard of the fixed axis gauge wheel 81), thus preventing excessive forces from being imposed on the wing folding mechanism 45 by the cantilevered outboard section 13 when transported over rough terrain or roads.

During a cultivating operation, the transport wheels 31, 32 are adjusted relative to the main and inboard sections 11, 12 so as to serve as gauge wheels controlling the depth of cultivation. The depth of cultivation will correspond to the depth established for the outboard section 13 by its gauge or depth control wheel 81. During a cultivating operation, the axis of wheel 81 is fixed; however, its axle support bracket 82 may be adjusted vertically, by means not shown, relative to the frame 18 of the outboard section 13 so as to permit a different fixed depth setting. As shown in FIG. 2, the implement has been raised on the support wheels 31, 32 to remove the cultivating shanks 16 from the ground. The implement may be transported in this manner, however, this is not usually practical because of narrow gates and roadways. Thus, when it is desired to move the cultivator to or from a field, the operator will first cause it to be folded. A typical sequence of folding the implement would be to contract the double acting hydraulic jack (actuator) 47 to cause the outboard section 13 to pivot from its aligned position (shown in FIG. 2) to a generally perpendicular or upright position shown in FIG. 3. In this folded position of outboard section 13, its frame member 77 abuts the cradle 76 on the outer end of support arm 62 and the latter has pivoted from its low silhouette condition (FIG. 2) to its upward, wide angle, pivoted support position (FIG. 3). The operator next causes the double acting jack (actuator) 46 to be contracted which in turn swings the inboard section 12 from its aligned position with main section 11 to an upright or generally vertical position shown in FIG. 4. In this condition, the cradle 52 of the fixed support 51 abuts the shaft 37 on inboard section 12 to support the latter in its folded position. It will be noted that in the completely folded condition of the foldable implement, the outboard section 13 is in an inverted overhead position relative to the main section 11. The exceptionally long support arm 62 affords excellent bracing for the overhead cantilevered section 13 whereby the folding mechanism 45 is relieved of excessive forces that it may otherwise be subjected to, particularly when the implement is transported over uneven terrain.

The low silhouette of the folding support 61 in the aligned or working condition (FIG. 2) of the implement sections affords a much more acceptable appearance than that which would be present if the support arm 62 would extend at 45 degrees to section 12 as it does in its support condition (FIGS. 3, 4).

The embodiments of the invention in which an exclusive property or privilege is claimed are defined as follows:

1. A foldable implement having first and second sections pivotally interconnected on a longitudinal folding axis and an actuator for causing the first section to fold from a working position in which said sections are in general alignment to a folded transport position characterized by
    a folding support independent of said actuator including
        a main support arm pivotally connected at one of its ends to one of said sections on a first longitudinal pivot axis parallel to and spaced laterally from said folding axis and
        a link having a fixed point at one of its ends pivotally connected to an intermediate point of said support arm on a second longitudinal axis and its other end pivotally connected to the other of said sections on a third longitudinal axis parallel to and spaced laterally from said folding axis, said folding support having a relatively low silhouette in the working position of said sections, said link causing said arm to swing from a predetermined angle relationship with said one section to a support position of increased angle relationship with said one section wherein the other end of said arm is in abutting relationship with said other section when the latter is pivoted from its working position to its folded transport position, said pivot connection between said arm and said one section being the only thrust transmitting relationship between said arm and said one section in said folded position of said one section.

2. The implement of claim 1 wherein said one section is said second section.

3. A foldable implement having an outboard section pivotally connected to an inboard section on a first longitudinal folding axis, a main section pivotally connected to said inboard section on a second longitudinal folding axis, means pivoting the outboard section about said first axis between an aligned position and a folded position relative to said inboard section and means for causing said inboard section to pivot about said second axis between an aligned position to a folded position relative to said main section characterized by
    a rigid support on one of said main and inboard sections operative to support the latter when it is pivoted to its folded position wherein it is vertically disposed relative to said main section,
    a folding support independent of said actuator including
        a main support arm pivotally connected at one of its ends to said inboard section on a longitudinal pivot axis parallel to and spaced laterally from said first folding axis and
        a link having a fixed point at one of its ends pivotally connected to an intermediate point of said support arm on a longitudinal axis and its other end pivotally connected to said outboard section on a longitudinal axis parallel to and spaced laterally from said first folding axis, said folding support having a relatively low silhouette in the aligned position of said inboard and outboard sections, said link causing said arm to swing from a predetermined angle relationship with said inboard section to a support position of increased angle relationship with said inboard section wherein the other end of said arm is in abutting relationship with said outboard section when the latter is pivoted from its aligned position to its folded position, said pivot connection between said support arm and said inboard section being the only thrust transmitting relationship between said arm and said inboard section in said folded position of said outboard section, said outboard section having an approximate right angle relationship with said inboard section when said outboard section is pivoted about said first folding axis to its folded position, said outboard section being in an inverted position above said main section when said inboard and outboard sections are pivoted to their folded positions.

* * * * *